Aug. 19, 1952 R. J. NEBESAR 2,607,708
METHOD FOR MAKING RESIN IMPREGNATED
AND COATED FABRIC SHEETS
Filed Aug. 2, 1949 2 SHEETS—SHEET 2

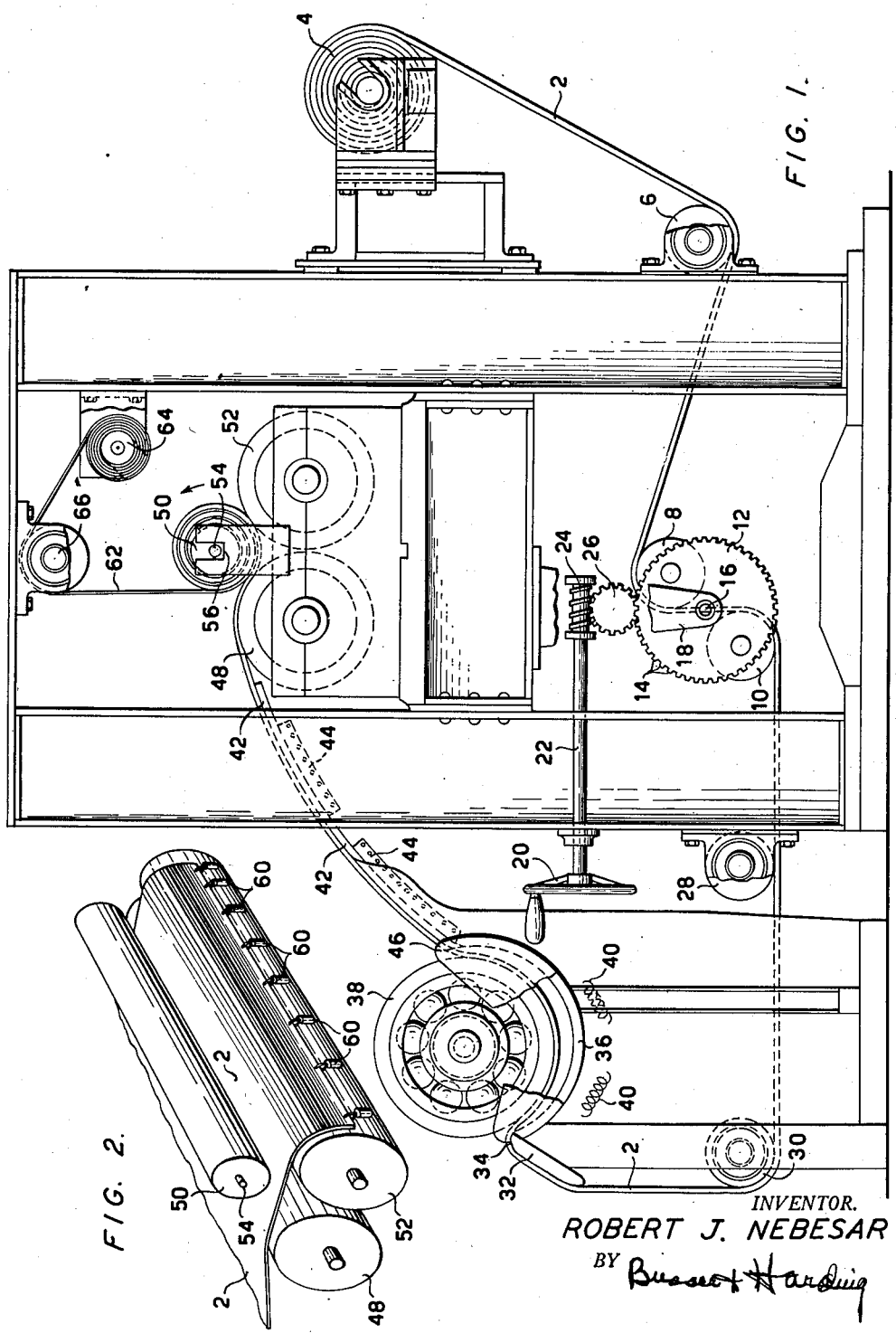

INVENTOR.
ROBERT J. NEBESAR
BY
ATTORNEYS.

Patented Aug. 19, 1952

2,607,708

UNITED STATES PATENT OFFICE 2,607,708

METHOD FOR MAKING RESIN IMPREGNATED AND COATED FABRIC SHEETS

Robert J. Nebesar, Bristol, Tenn., assignor to Universal Moulded Products Corporation, Bristol, Va., a corporation of Delaware Application August 2, 1949, Serial No. 108,222

3 Claims. (Cl. 117—48)

This invention relates to a process for making synthetic resin impregnated and coated fabric sheets which are woven and the product of the process.

The method in accordance with this invention is of particular utility in that it provides resin impregnated and coated fabric sheets in much wider width than heretofore known methods have been able to achieve. Further, the method in accordance with this invention provides such sheets having superior uniformity of structure.

An object of this invention is to provide synthetic resin impregnated and coated fabric sheets.

An additional object of this invention is to provide synthetic resin impregnated and coated fabric sheets in wide widths.

A further object of this invention is to provide synthetic resin impregnated and coated fabric sheets having superior uniformity of structure.

These and other objects of this invention will become apparent from the following description, read in conjunction with the accompanying drawings, in which:

Figure 1 is a side elevation of exemplary apparatus which may be used to carry out the method in accordance with this invention;

Figure 2 is a schematic perspective view illustrating how the sheet is weighted prior to being rolled on the mandrel;

Figure 4:
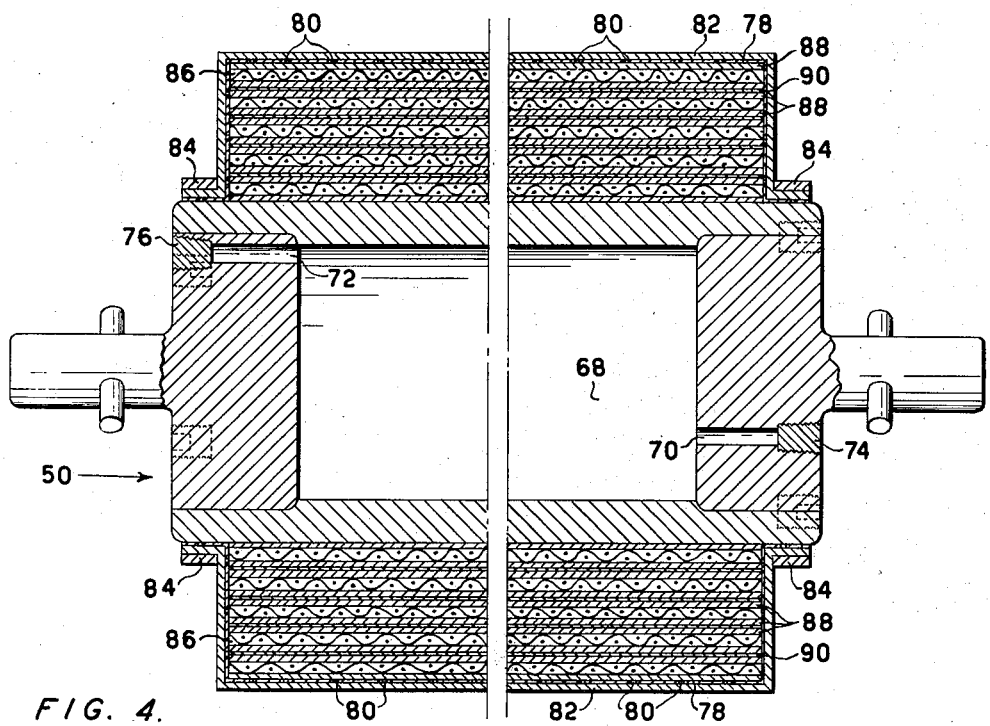
Figure 4 is a section taken on the plane indicated by the line 4—4 in Figure 3 showing the mandrel just after curing.

The fabric used in carrying out this invention may be any woven fabric which it is desired to impregnate and coat with a synthetic resin. Thus, for example, the fabric might be woven from a substantially inert continuous filament such as a glass fiber filament. Similarly, fabrics woven from silk, rayon, cotton or other suitable fibers may be used.

Where the fabric was woven from a glass fiber filament, it is usually necessary to chemically treat the fabric prior to use in order to improve its wetting properties and eliminate preparations such as lubricants adhered to the fibers to facilitate their weaving. This may be done, for example, by burning them off. Such treatments are well known in the art. The wetting properties of glass fiber fabrics are known to be improved, for example, by the use of a mixture of 1% methacrylic chrome complex, 97.5% water and 1½% neutralizing solution comprising 5% sodium formate, 0.2% formic acid and 94.8% water.

The synthetic resin may be any of the thermosetting or thermoplastic resins of the so-called low pressure type, that is, which may be cured by heat at low pressure. Where the dielectric properties of the sheet are important, such synthetic resins, which are well known to have superior dielectric properties, will be selected. Similarly appropriate resins must be selected to resist the particular corrosive action to be encountered.

As exemplary of a synthetic thermoplastic resin which may be used is dichlorostyrene. This resin is transparent or semi-transparent and resistant to the action of chemicals.

As exemplary of synthetic thermosetting resins which may be used are a composition comprising a substantially linear polyhydric alcohol ester of an unsaturated polybasic acid material of the maleic type and a substituted ethylene body of resin forming characteristics which is copolymerizable and miscible with the polyhydric alcohol ester. Thus, for example, the composition may be diethylene glycol maleate or diethylene glycol fumarate having incorporated therewith vinyl acetate, amylacrylate, or vinyl chloride. The curing of such a maleic substituted ethylene composition will be accelerated by using a curing catalyst such as benzoyl peroxide, phthalyl peroxide or air-blown dioxane. Such thermosetting resins are well known in the art and reference may be made to Patent 2,255,313, issued September 9, 1941, to Carleton Ellis for further information relative to them.

The steps in the method in accordance with this invention will be made apparent from a description of the method as carried out by the use of the apparatus shown in Figures 1 and 2, it being apparent that the apparatus disclosed in no manner limits the invention since it is obvious that the method may be performed by numerous other forms of apparatus. As shown in Figure 1, a fabric sheet 2 is fed from a supply roll 4. Sheet 2 passes under roller 6 and thence to tension rollers 8 and 10, it being noted that the sheet passes over roller 8 and under roller 10.

Rollers 8 and 10 are secured to a disc 12 which has gear teeth 14. Disc 12 is rotatably secured at 16 to bracket 18 and is adapted to be rotated by movement of the handle 20 through shaft 22, worm 24 and gear 26. Rollers 8 and 10 are similarly rotatably secured to a rotatable disc disposed oppositely to disc 12 (not shown). Rollers 8 and 10, together with the discs and the associated described mechanism, form a tension control mechanism commonly used in the art. It will be apparent that the more disc 12 is rotated counterclockwise as viewed in Figure 1, the greater the tension induced in sheet 2 will be.

After leaving roller 10, sheet 2 passes under roller 28 and roller 30 and thence to sloping plate 32. On passing over rounded portion 34 of plate 32, sheet 2 enters impregnating basin 36. Sheet 2 is guided through basin 36 by a roller 38. Basin 36 contains the impregnating resin, together, if necessary, with a suitable catalyst, the mixture being maintained in a heated liquid condition, say about 190° F. by means of heating coils 40 (shown schematically).

Sheet 2 leaves roller 38 and passes out of basin 36 onto curved plate 42 which is maintained at an elevated temperature, say about 190°, by means of heating coils 44. It will be noted that, on leaving basin 36, sheet 2 is necessarily flexed at 46. This flexing is highly desirable in that it implements the complete impregnation of the sheet with resin. During its passage over heated plate 42, the resin is given ample opportunity to fully soak or impregnate the sheet, the length of the plate being selected to achieve this end.

On leaving plate 42, sheet 2 passes over roller 48, between roller 48 and mandrel 50 and then between mandrel 50 and roller 52. Mandrel 50 is connected to a driving mechanism and drives rollers 48 and 52 frictionally.

Mandrel 50 will have a smooth surface, preferably a nickel or chrome plated surface. It will be noted that mandrel 50 is not forced downwardly except by its own weight. The weight of the mandrel is selected to exert a pressure against the two rollers of about ten pounds per inch of length. When the weight of the mandrel is insufficient to exert the desired pressure, added pressure may, of course, be exerted by conventional means such as by securing weight to the spindles or by the use of hydraulic rams.

In order to start rolling cloth 2 on mandrel 50, the cloth, as shown in Figure 2, is stretched across rollers 48 and 52, great care being taken to prevent the formation of any unevenness or folds in the cloth. Weights 60 are clamped to the end of the cloth to hold it in position while the mandrel 50 is lowered.

Before mandrel 50 is lowered, it is coated with the selected synthetic resin, catalyzed or not as necessary, and the resin is permitted to become somewhat tacky. The mandrel is now lowered so as to rest on sheet 2 and rollers 48 and 52. Weights 60 insure that the sheet 2 is maintained straight and even during this operation. The mandrel having been lowered, weights 60 are removed and rollers 48 and 52 are moved so as to position the leading edge of cloth 2 between mandrel 50 and roller 52 to insure that the leading edge is adhered to a mandrel 50. Mandrel 50 is now reversed, driving rollers 48 and 52 in a clockwise direction as viewed in Figure 1. During the formation of the first wrap, the cloth or the sheet 2 on mandrel 50 will desirably be given an additional coating of resin.

A complete wrap of sheet 2 having been formed on mandrel 50, the mandrel is stopped and a sheet 62 of regenerated cellulose, such as, for example, cellophane, is positioned between the portion of sheet 2 lying against roller 48 and the portion of sheet 2 wrapped on the mandrel 50, great care being taken to insure that sheet 62 is laid in place so as to feed evenly without wrinkles or gathers. Sheet 62 is fed from a supply roll 64 and passes over roller 66.

The mandrel 50 may be now started to turn causing both sheets 62 and 2 to be rolled onto it. The speed of rollers 48 and 52 must be carefully selected. The speed of the rollers and the length of plate 42 must be selected so as to provide adequate time for the resin to thoroughly impregnate the sheet 2 while it is travelling on plate 42. This selected speed, of course, will be varied by various factors, particularly the temperature at which the resin is maintained, the fluidity of the resin used and the mesh and thickness of the cloth used. As the sheet 2 is wound over previous wraps on mandrel 50, it causes contained air bubbles in the portion of the sheet being wrapped onto the mandrel to escape. The speed of rolling must be selected so that there will be sufficient time for the major portion of the air bubbles to escape before they are trapped by the next succeeding wrap. This prevents the completed product from having contained air bubbles of such size as would weaken the structure of the sheet.

Although it will be apparent that the speed of mandrel 50 will vary considerably depending upon the various factors discussed above, it has been found, for example, that a speed resulting in a linear travel of the sheet 2 at a rate of about five to fifteen inches per minute depending on the thickness of the cloth is satisfactory.

It is also of importance that the tension of the sheet 2 being fed to mandrel 50 be maintained at a proper value. The tension should be sufficient to insure that the sheet 2 will be wrapped tightly onto mandrel 50. However, the tension must not be sufficiently great to prevent the formation of a layer of resin between each sheet 2 and each cellophane sheet 62. Although it will be apparent that the tension will vary depending on the materials used, it has been found generally satisfactory to utilize a tension of about 1 lb. per inch of width of the sheet 2.

When a desired number of wraps has been formed on mandrel 50, the sheets 2 and 62 are severed with a knife and the unwrapped portion wrapped onto the mandrel 50. It is generally desirable to sever sheet 2 in the vicinity of the end plate 42 and then sever sheet 62 at a point to insure that sheet 62 will be long enough to maintain a separation between the last two wraps of sheet 2.

Mandrel 50 is lifted from rollers 48 and 52 by a gradual upward movement while it is still rotating. This insures a proper parting of sheet 2 or sheet 62 from rollers 48 and 52. Thus, for example, it is desirable that the full weight of mandrel 50 be gradually lifted off rollers 48 and 52 so as to fully relieve these rollers of the weight of the mandrel at the completion of about one-half of a turn of mandrel 50. Where mandrel 50 is permitted to stop, it has been found to result in undesirable irregularities in the formation of the sheet in that the portion of the sheet between the mandrel and rollers 48 and 52 will not have proper surface coatings of resin.

Mandrel 50 is now removed to a suitable location for curing. As shown more clearly in Figure 4, mandrel 50 has a hollow interior 68 and exteriorly leading passages 70 and 72 which have, respectively, threaded plugs 74 and 76. During the curing of the resin, plugs 74 and 76 are removed. A steam supply line is connected to passage 70 and a steam exhaust line is connected to passage 72, thus providing for the passage of steam through interior 68.

Before steam is admitted, sheet 62 is cut off so as to terminate at the end of sheet 2 and a wrapper 78, which may, for example, be cellophane and have perforations 80, is laid over the exterior of the wrappings on the mandrel. Overlying the wrapper 78 is a wrap 82 of paper, for example, kraft paper, which serves as a heat insulator and absorbs the excess resin passing through the perforations in wrapper 78. Wrappers 78 and 82 are secured in position by means of tapes 84.

Steam at from about 212° F. to 220° F. is now supplied to circulate through mandrel interior 68 in order to cure the synthetic resin. It will be apparent that the length of time necessary to accomplish the curing will depend upon the resin selected, the curing times of the various resins which may be used in carrying out this invention being well known to the art.

During the curing between application of heat, the mandrel is rotated or oscillated to prevent the sagging of the cloth, thus insuring a uniform product.

Figure 3:
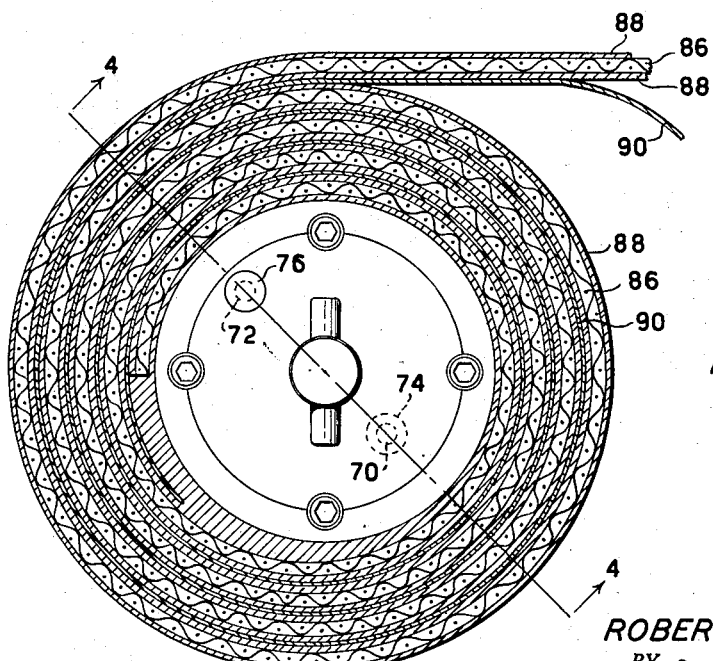
Figure 3 is an end view of a mandrel showing how the finished sheet is unrolled from the mandrel.

Referring now to Figures 3 and 4, it will be seen that on completion of the curing I have wrapped on the mandrel resin impregnated sheets 86 having on either side a coating 88 of synthetic resin. Adjoining coatings 88 are separated by a layer of cellophane 90.

The curing process having been completed, the mandrel is mounted so that it can turn freely. Impregnated sheet 86 having on each side a thin resin layer 88 may now readily be pealed off or unwound as a sheet from the mandrel. This is made possible by the fact that synthetic resins do not adhere well to a regenerated cellulose.

It will be apparent that sheets of great length and having great uniformity may readily be formed in the above outlined manner.

What I claim and desire to protect by Letters Patent is:

1. The method of making a synthetic resin coated and impregnated woven fabric which comprises passing a fabric sheet into an impregnating bath comprising a thermosetting alkyd resin of the low pressure type, flexing and slightly heating the impregnated sheet to facilitate complete impregnation thereof, said heating being insufficient to set the resin, winding said impregnated sheet together with a flexible cellulose film separating sheet into a roll at a low linear rate of speed of about five to fifteen inches per minute to permit the escape of entrapped gas in said impregnated sheet, said winding of the impregnated sheet being carried out and maintained under tension, encasing the roll in a non-absorbent perforated first wrapper and an absorbent second wrapper, curing the resin by heating the roll, removing said wrappers, unwinding the impregated and coated sheet and the separating sheet and finally stripping the separating sheet from the impregnated sheet.

2. The method in accordance with claim 1 in which the alkyd resin is diethylene glycol maleate.

3. The method in accordance with claim 1 in which the alkyd resin is diethylene glycol fumarate.

ROBERT J. NEBESAR.

REFERENCES CITED

The following references are of record in the file of this patent:

UNITED STATES PATENTS

| Number | Name | Date |
|---|---|---|
| 1,611,400 | Andrews | Dec. 21, 1926 |
| 2,106,850 | McCulloch | Feb. 1, 1938 |
| 2,255,313 | Ellis | Sept. 9, 1941 |
| 2,274,260 | Schelhammer | Feb. 24, 1942 |
| 2,443,737 | Kropa | June 22, 1948 |
| 2,517,698 | Muskat | Aug. 8, 1950 |
| 2,523,410 | Allard | Sept. 26, 1950 |